(No Model.)
J. DISTER.
PATTY PAN AND HOLDER.
No. 489,372. Patented Jan. 3, 1893.
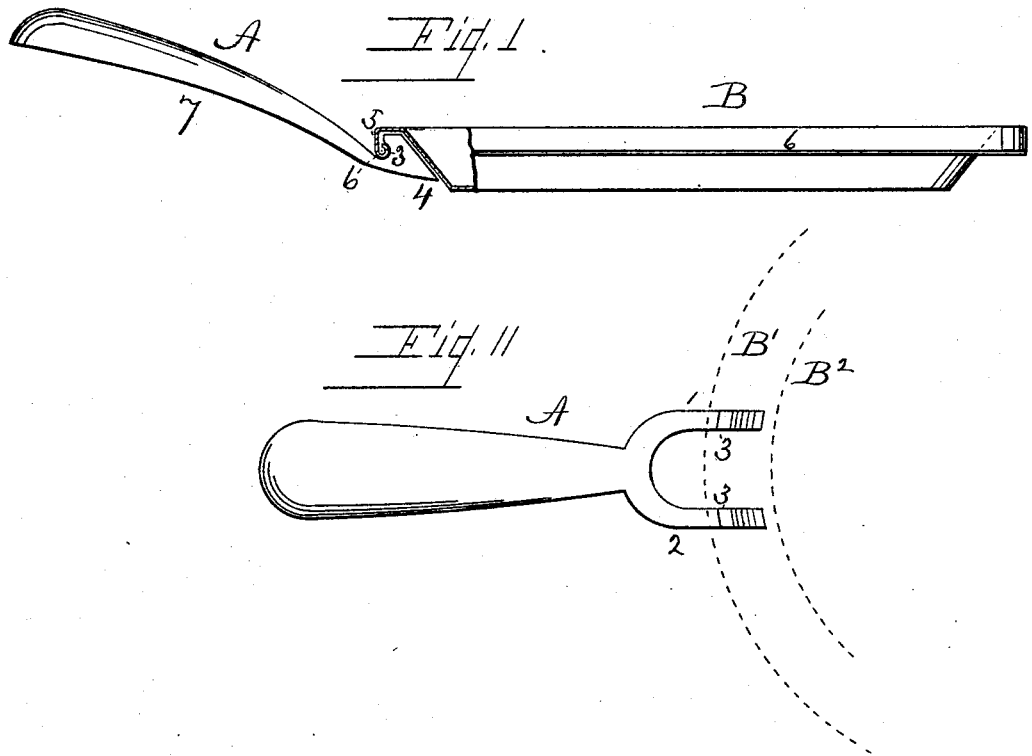
Witnesses
Leopold Leibold
John Frantxmann
Inventor
Joseph Dister
By His Attorney B. Pickering

UNITED STATES PATENT OFFICE.

JOSEPH DISTER, OF DAYTON, OHIO, ASSIGNOR OF ONE-HALF TO OSCAR SOEHNER, OF SAME PLACE.

PATTY-PAN AND HOLDER.

SPECIFICATION forming part of Letters Patent No. 489,372, dated January 3, 1893.

Application filed April 27, 1892. Serial No. 430,910. (No model.)

*To all whom it may concern:*

Be it known that I, JOSEPH DISTER, a citizen of the United States, residing at Dayton, in the county of Montgomery and State of Ohio, have invented certain new and useful Improvements in Patty-Pans and Holders; and I do hereby declare that the following is a full, clear, and exact description of the invention, which will enable others skilled in the art to which it appertains to make and use the same, reference being had to the accompanying drawings, and to the letters and numerals of reference marked thereon, which form a part of this specification.

My invention relates to improvements in patty pans and holders, the several features of which will be fully hereinafter described and claimed.

The object of my invention is to so construct a patty pan, that a form of holder especially adapted to engage the rim of said patty pan, so that the same may be conveniently handled. The construction is illustrated in the accompanying drawings, in which,—

Figure I is a side view of the patty pan and the holder, with a part of the former cut away. Fig. II is a top view of the holder.

Like letters and numerals designate like parts in the two views.

The patty pan B has the usual form with the exception that the rim 5, which is bent down at a right angle to the line of the top, and on the edge is formed the bead 6.

The handle A comprises the part, 7, to be grasped by the hand, the notch 3, to engage the bead of the patty pan, and the tapering part 4, to bear against the inclined side of the pan.

The holder may be constructed with a single terminal, or have a divided or forked terminal, as shown at Fig. 2; which form is preferable. In this figure, the circular dotted line B' shows the position of the rim, and B² the bottom out-line.

In use the point of the handle is slipped under the rim, until the bead of said rim drops beneath the notch of said handle or holder; and in this manner the patty pan may be readily carried.

Having fully described my invention, what I claim and desire to secure by Letters-Patent is 1. The holder comprising the handle portion 7, the notch 3, to engage the rim of a patty pan, and the inclined point 4 to bear against the side of the same, substantially as shown and described.

2. The patty pan provided with a vertical rim beaded on the edge, and adapted to be engaged by a suitable holder, substantially as shown and described.

3. The combination of the patty pan B with beaded rim, and the holder A notched to engage said rim, and an inclining point to bear against the side of said patty pan, substantially as shown and described.

In testimony that I claim the foregoing as my own I affix my signature in presence of two witnesses.

JOSEPH DISTER.

Witnesses:
 B. PICKERING,
 O. F. DAVISSON.